(12) United States Patent
Kawato et al.

(10) Patent No.: US 12,188,573 B2
(45) Date of Patent: Jan. 7, 2025

(54) SPOOL VALVE

(71) Applicant: EAGLE INDUSTRY CO., LTD., Tokyo (JP)

(72) Inventors: Tadanobu Kawato, Tokyo (JP); Naoki Nishimura, Tokyo (JP); Masaki Hoshi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/034,663

(22) PCT Filed: Oct. 25, 2021

(86) PCT No.: PCT/JP2021/039230
§ 371 (c)(1),
(2) Date: Apr. 28, 2023

(87) PCT Pub. No.: WO2022/097515
PCT Pub. Date: May 12, 2022

(65) Prior Publication Data
US 2023/0392697 A1 Dec. 7, 2023

(30) Foreign Application Priority Data

Nov. 5, 2020 (JP) ................................. 2020-185375

(51) Int. Cl.
*F16K 11/07* (2006.01)
*F16K 31/06* (2006.01)

(52) U.S. Cl.
CPC .......... *F16K 31/0613* (2013.01); *F16K 11/07* (2013.01); *F16K 11/0708* (2013.01); *Y10T 137/8671* (2015.04)

(58) Field of Classification Search
CPC .. F16K 11/0708; F16K 11/07; F16K 31/0613; Y10T 137/8671
See application file for complete search history.

(56) References Cited

U.S. PATENT DOCUMENTS

| 4,593,719 | A | 6/1986 | Leonard | F15B 13/043 |
| 6,453,947 | B1 | 9/2002 | Inoue et al. | F15B 13/044 |
| 2004/0011982 | A1 | 1/2004 | Hirata et al. | |
| 2017/0051836 | A1* | 2/2017 | Guarino | F16K 11/0708 |
| 2017/0198727 | A1* | 7/2017 | Reynolds | F15B 13/043 |

(Continued)

FOREIGN PATENT DOCUMENTS

| CN | 1752430 | 3/2006 | F02M 51/00 |
| JP | 2001-263529 | 9/2001 | F16K 31/06 |

(Continued)

OTHER PUBLICATIONS

International Search Report, Written Opinion and International Preliminart Report on Patentability issued in PCT International Patent Application Serial No. PCT/JP2021/039230, dated Nov. 30, 2021, with translations, 21 pages.

(Continued)

*Primary Examiner* — Kelsey E Cary
(74) *Attorney, Agent, or Firm* — HAYES SOLOWAY P.C.

(57) ABSTRACT

A spool valve includes a sleeve having a plurality of ports, and a spool arranged inside the sleeve and having a land formed so as to be brought into sliding contact with inner walls of the sleeve. A depression is formed in the land over an entire circumference.

14 Claims, 8 Drawing Sheets

(56) References Cited

U.S. PATENT DOCUMENTS

| | | | | |
|---|---|---|---|---|
| 2017/0306989 A1* | 10/2017 | Coolidge | .............. | F15B 11/161 |
| 2017/0350097 A1* | 12/2017 | Kang | ........................ | E02F 3/42 |
| 2018/0163888 A1* | 6/2018 | Ishikawa | ................ | F16K 11/07 |
| 2019/0128409 A1* | 5/2019 | Mason | .................... | F16K 25/04 |
| 2019/0249788 A1* | 8/2019 | Tanimura | .................. | F16K 3/24 |
| 2020/0292100 A1* | 9/2020 | Tanaka | .................. | F16K 31/047 |

FOREIGN PATENT DOCUMENTS

| | | | | |
|---|---|---|---|---|
| JP | 2009-115289 | 5/2009 | ............. | F16K 31/06 |
| JP | 2014-163478 | 9/2014 | ............. | F16K 11/07 |
| WO | WO0218828 | 3/2002 | | |

OTHER PUBLICATIONS

European Search Report issued in related European Application Serial No. 21889068.9, dated Sep. 9, 2024, 7 pages.

* cited by examiner

SPOOL VALVE

TECHNICAL FIELD

The present invention relates to a spool valve suitable for fluid control.

BACKGROUND ART

In various industrial fields, valves suitable for controlling fluid are capable of controlling the pressure and flow rate of fluid by adjusting the degree of opening of the valve due to the movement of a valve body. Typical types of such valves include the spool type in which the valve body moves in parallel to an opening, which is a valve seat, and the lift type in which the valve body moves perpendicular to an opening, which is a valve seat. In particular, the spool type has the advantage of being able to handle a wide range of fluid pressures without exerting force from the fluid in the moving direction of a spool, which is a valve body, and the advantage of being able to easily configure a multi-port structure.

A spool valve described in Patent Citation 1, which is an example of such a spool valve, has a spool driven in an axial direction by a solenoid and extending through a cylindrical sleeve with steps on the inner side. The spool has a plurality of lands, and the lands move in sliding contact with the inner wall of the sleeve. Further, the sleeve is provided with an inlet port and an outlet port.

When the solenoid is not energized, one of the lands faces the inlet port, the inlet port is closed by said land, and the valve is in a closed state in which the flow of fluid from the inlet port to the outlet port is blocked. Further, when the solenoid is energized, the driving force of the solenoid causes the spool to move in the axial direction against the biasing force of the coil spring, and the valve is brought into an open state in which the flow of fluid from the inlet port to the outlet port is allowed.

CITATION LIST

Patent Literature

Patent Citation 1: JP 2014-163478 A (Pages 4, 5, FIG. 1)

SUMMARY OF INVENTION

Technical Problem

Accordingly, the spool valve described in Patent Citation 1 can control the pressure and flow rate of the fluid by adjusting the amount of energization to the solenoid and adjusting the degree of opening of the valve according to said amount of energization. However, when the valve is switched from the closed state to the open state, for example, the flow of fluid from the inlet port to the outlet port occurs, and high-pressure fluid flows through the inlet port, which may result in a force that transiently moves the spool in a radial direction. As a result, the spool may be slightly tilted or deformed to cause the land to bite into the inner wall of the sleeve, causing a hydraulic lock. Accordingly, the smooth movement of the spool may be hindered.

The present invention has been made in view of such problems, and an object of the present invention is to provide a spool valve capable of stably moving a spool in an axial direction.

Solution to Problem

In order to solve the problems described above, a spool valve according to the present invention includes: a sleeve having a plurality of ports; and a spool arranged inside the sleeve and including a land formed so as to be brought into sliding contact with an inner wall of the sleeve, wherein a depression is formed over an entire circumference in at least one of the land and the inner wall of the sleeve with which the land is brought into sliding contact. According to the aforesaid feature of the present invention, the depression retains the fluid to maintain a good lubrication state between the land of the spool and the inner wall of the sleeve. Accordingly, the spool can be stably moved in the axial direction. Further, the fluid can be supplied between the inner wall of the sleeve and the land regardless of the circumferential position to improve the lubrication state between the land of the spool and the inner wall of the sleeve regardless of the circumferential position.

It may be preferable that the depression is formed of a plurality of depression portions, and at least one of the land and the inner wall of the sleeve with which the land is brought into sliding contact may have a load receiving portion between the adjacent depression portions, the load receiving portion being brought into sliding contact with the inner wall of the sleeve or the land. According to this preferable configuration, when the spool is about to be tilted or deformed relative to the sleeve, it is supported by the load receiving portion. Accordingly, the spool can be prevented from being tilted or deformed to a large extent relative to the sleeve.

It may be preferable that the depression extends in an axial direction. According to this preferable configuration, the fluid can be supplied to positions separated in the axial direction. Further, when a valve body moves, it is likely to communicate with any of the ports. In addition, when the valve body communicates with the port, the fluid can be supplied from said port to prevent the depletion of the fluid.

It may be preferable that the land faces an inlet port through which fluid flows into the sleeve. According to this preferable configuration, the depression is provided in at least one of the land facing the inlet port and the inner wall of the sleeve with which said land is brought into sliding contact, so that the land that is likely to be affected by the fluid and the inner wall of the sleeve with which said land is brought into sliding contact are kept well lubricated. Accordingly, the spool can be stably moved in the axial direction.

It may be preferable that the depression is in communication with an annular space which is in communication with the inlet port. According to this preferable configuration, the fluid that has flowed in from the inlet port is dispersed in the circumferential direction by the annular space, and the force that moves the spool in a radial direction is reduced. Accordingly, the land is less likely to bite into the inner wall of the sleeve, and a good lubrication state can be maintained between the land and the inner wall more stably.

It may be preferable that the depression is in communication with a storage groove in which fluid is stored. According to this preferable configuration, the fluid from the storage groove is also supplied to the depression, so that the fluid can be supplied more reliably.

It may be preferable that the depression is separated from opposite ends in the axial direction of a portion in which the depression is formed in at least one of the land and the inner wall of the sleeve with which the land is brought into sliding contact. According to this preferable configuration, the fluid in the depression is prevented from leaking to the adjacent space.

DESCRIPTION OF EMBODIMENTS

Modes for carrying out a spool valve according to the present invention will be described below based on embodiments.

First Embodiment

A spool valve according to a first embodiment of the present invention will be described with reference to FIG. 1 to FIG. 4. Hereinafter, the right and left sides as viewed from the front in FIG. 1 will be described as the right and left sides of the spool valve. Specifically, the right side of the plane of paper on which a solenoid 80 is arranged will be described as the right side of the spool valve, and the left side of the plane of paper on which a coil spring 90 is arranged will be described as the left side of the spool valve. A depression may be illustrated with a dot-like texture.

Figure 1:
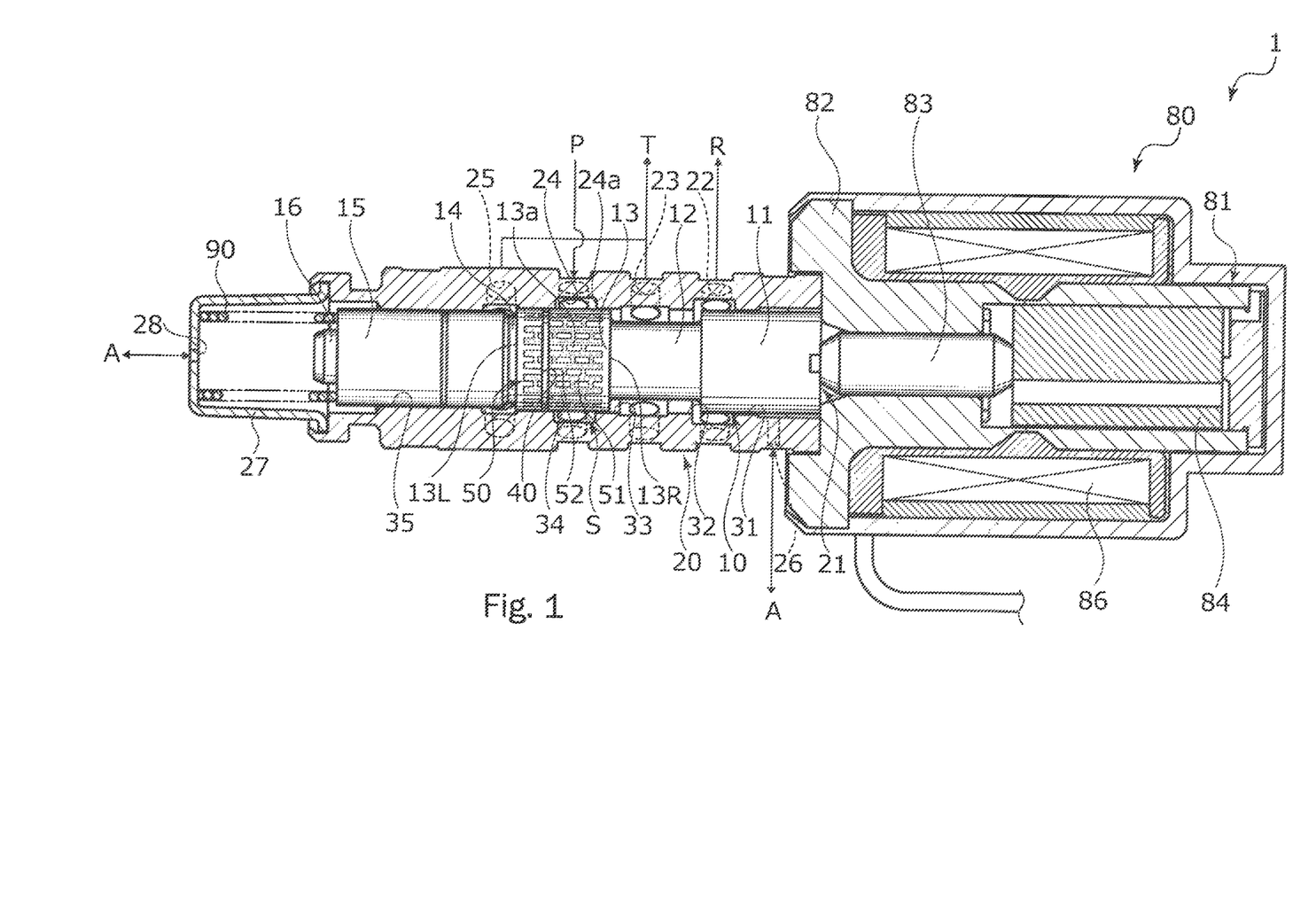
FIG. 1 is a partially cutaway cross-sectional view illustrating a state in which a spool valve according to a first embodiment of the present invention is closed.

Referring to FIG. 1, a spool valve 1 is a spool solenoid valve that adjusts the flow rate of oil. The fluid whose flow rate and the like are adjusted by the spool valve 1 is not limited to oil.

As illustrated in FIG. 1, the spool valve 1 mainly includes a spool 10, a sleeve 20, the solenoid 80, and the coil spring 90. The spool 10 is made of metal material or resin material. The spool 10 extends through the sleeve 20 so as to be movable in an axial direction. The solenoid 80 is connected to the sleeve 20 and exerts a driving force on the spool 10 in a valve open direction. The coil spring 90 is arranged within the sleeve 20 and exerts a biasing force on the spool 10 in a valve closing direction.

The solenoid 80 mainly includes a casing 81, a stator 82 as a fixed core, a rod 83, a moving core 84, and an exciting coil 86. The stator 82 is part of the casing 81. The rod 83 extends through the casing 81 and is arranged so as to reciprocate in the axial direction. The moving core 84 extends through the casing 81 and transmits the driving force to the rod 83. The coil 86 is wound around the casing 81 via a bobbin.

A leftward-facing T-shaped stator 82 is arranged at the left end portion of the casing 81. An axially rightward recessed recess is formed in the center of the left end portion of the stator 82. The right end portion of the sleeve 20 is press-fitted and fixed in the recess.

The sleeve 20 is formed into a stepped cylindrical shape with a through hole 21 formed in the center in a radial direction and extending through the sleeve 20 in the axial direction.

Further, the sleeve 20 has a discharge port 22, an outlet port 23, an inlet port 24, and a feedback port 25 in order from the right in the axial direction. The discharge port 22 is in communication with an oil reservoir R. The outlet port 23 is in communication with a load T. The inlet port 24 is in communication with a hydraulic pump P. The feedback port 25 is in communication with the outlet port 23. Each of the ports 22 to 25 is a flow path extending mainly in the radial direction with respect to the through hole 21.

Further, a first inner wall 31, a second inner wall 32, a third inner wall 33, a fourth inner wall 34 and a fifth inner wall 35 are formed on the inner diameter side of the sleeve 20. The first inner wall 31 protrudes radially inward on the right side of the discharge port 22 in the axial direction and is formed into an annular shape. The second inner wall 32 protrudes radially inward on the left side of the discharge port 22 in the axial direction and is formed into an annular shape. The third inner wall 33 protrudes radially inward on the left side of the outlet port 23 in the axial direction and is formed into an annular shape. The fourth inner wall 34 protrudes radially inward on the left side of the inlet port 24 in the axial direction and is formed into an annular shape. The fifth inner wall 35 protrudes radially inward on the left side of the feedback port 25 in the axial direction and is formed into an annular shape.

A recess 24a is formed on the inner diameter side of the sleeve 20. The recess 24a is recessed radially outward between the third inner wall 33 and the fourth inner wall 34 and is formed into an annular shape. An annular space S is defined by the recess 24a and is in communication with the inlet port 24 and the through hole 21. The through hole 21 according to this embodiment is a cylindrical hole defined by the inner walls 31 to 35.

Further, the sleeve 20 has a breathing passage 26 formed on the right side of the first inner wall 31 in the axial direction and being in communication with an outside space A outside the sleeve 20.

Further, a retainer 27 that holds the coil spring 90 is caulked to the left end portion of the sleeve 20. Further, a breathing passage 28 is formed at the bottom of the retainer 27 and is in communication with the outside space A.

The volume of the space between the solenoid 80 and the spool 10 and the volume of the space between the spool 10 and the retainer 27 change as the spool 10 moves. Since the breathing passages 26, 28 are in communication with the outside space A outside the sleeve 20, the fluid flows through breathing passages 26, 28 from the outside space A and flows through the breathing passages 26, 28 to the outside space A according to the change in volume. Accordingly, the pressure in the spaces is kept substantially the same.

Figure 3:
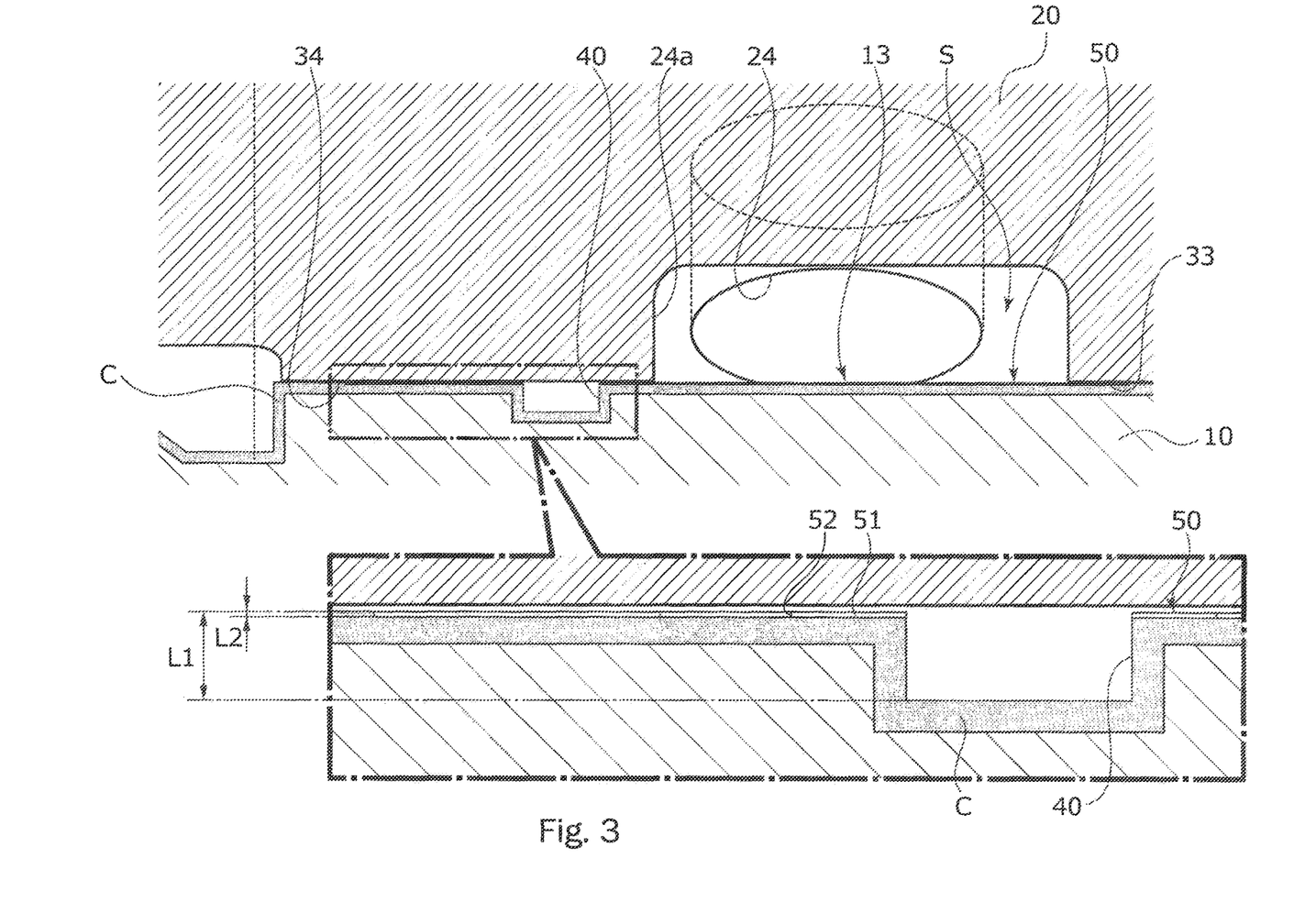
FIG. 3 is an enlarged cross-sectional view of a main part of the spool valve in the first embodiment.
Figure 4:
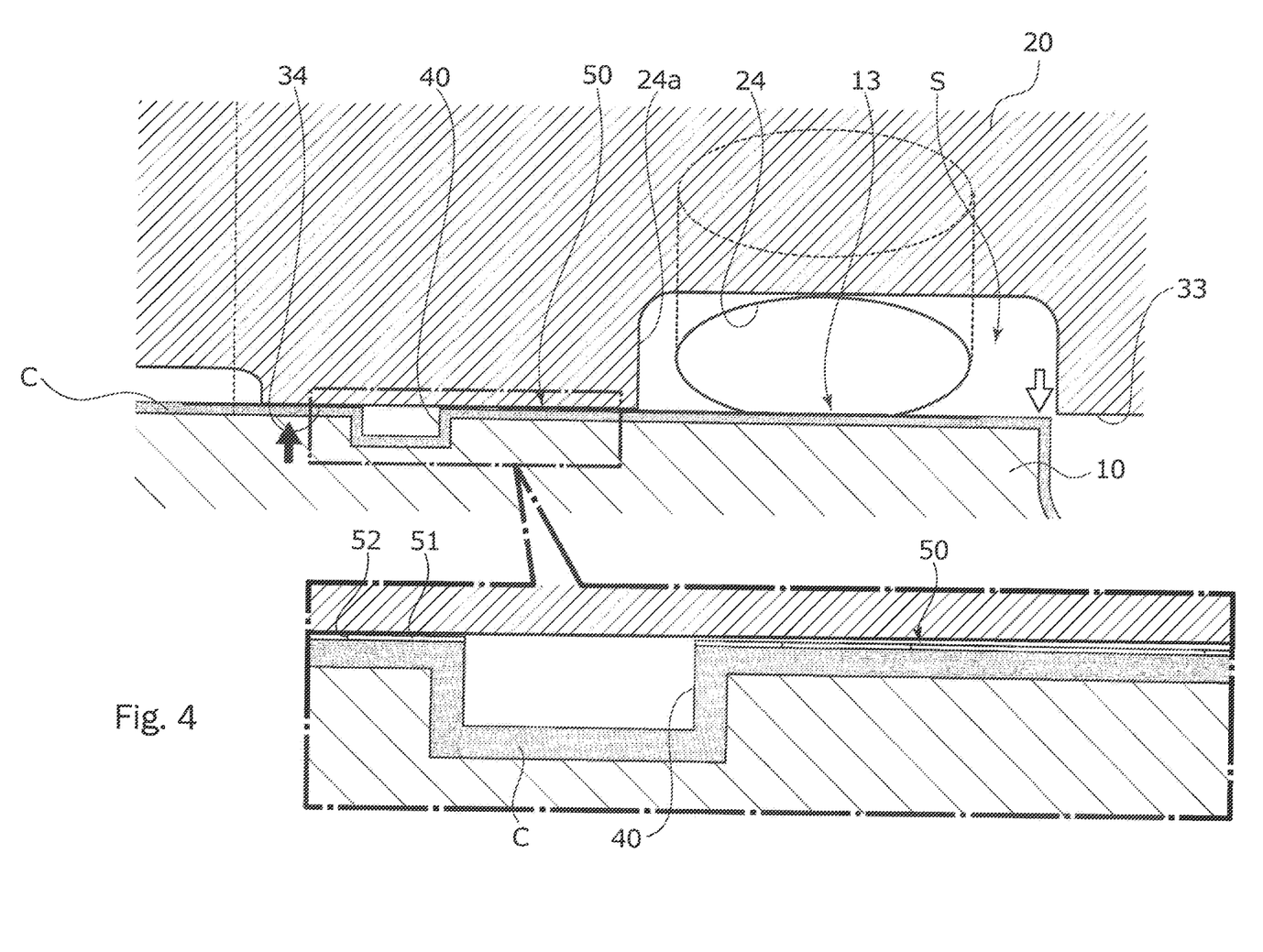
FIG. 4 is an enlarged cross-sectional view illustrating a state in which a spool is tilted relative to a sleeve in the first embodiment.

The spool 10 is formed into a columnar shape with steps on the outer diameter side. The outer peripheral surface of the spool 10 is coated with plating, diamond-like carbon (DLC), molybdenum disulfide, etc. for the purpose of improving slidability and preventing corrosion, to form a coating layer C (see FIG. 3). In FIGS. 3 and 4, the coating layer C is exaggeratedly illustrated for convenience of explanation. Further, the coating layer C may be formed on the inner peripheral surface of the sleeve 20, and neither the spool 10 nor the sleeve 20 may be coated.

The spool 10 has a first land 11, a first small diameter portion 12, a second land 13, a second small diameter portion 14, a third land 15, and a third small diameter portion 16 in order from the right in the axial direction. The first small diameter portion 12 is formed to have a smaller diameter than the first land 11. The second land 13 is formed to have a larger diameter than the first small diameter portion 12. The second small diameter portion 14 is formed to have a smaller diameter than the second land 13. The third land 15 is formed to have a larger diameter than the second small diameter portion 14. The third small diameter portion 16 is formed to have a smaller diameter than the third land 15.

Figure 2:
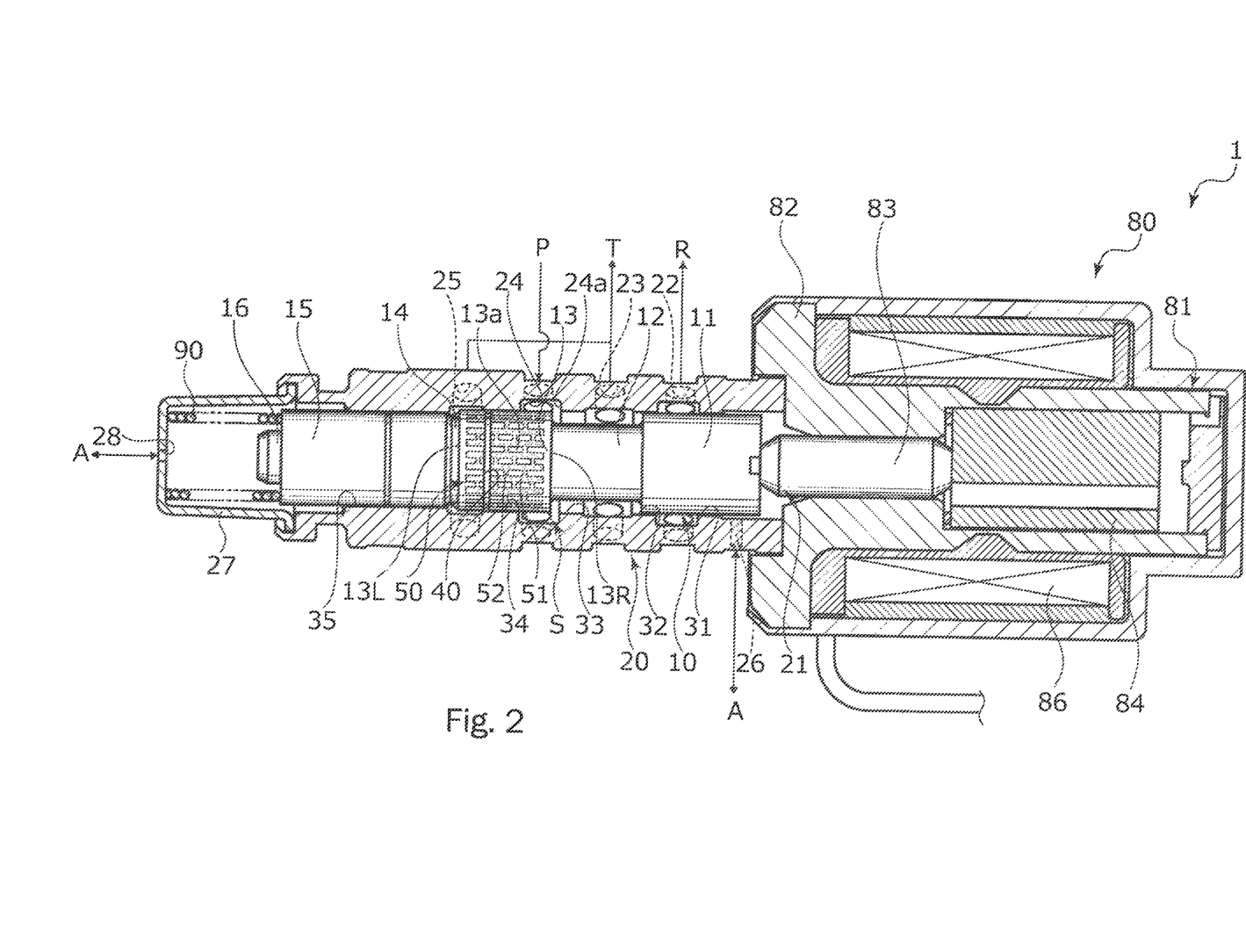
FIG. 2 is a partially cutaway cross-sectional view illustrating a state in which the spool valve according to the first embodiment of the present invention is open.

Referring to FIGS. 1 and 2, with the spool 10 extending through the through hole 21 of the sleeve 20, the first land 11 is arranged so as to be brought into sliding contact with the first inner wall 31 and the second inner wall 32. The second land 13 is arranged so as to be brought into sliding contact with the third inner wall 33 and the fourth inner wall 34. The third land 15 is arranged so as to be brought into sliding contact with the fifth inner wall 35.

Referring to FIGS. 1 to 3, an annular storage groove 40 and a ladder lottery-shaped depression 50 are formed in the second land 13. The storage groove 40 is a groove formed by cutting the second land 13 before coating into an annular shape over the circumference and then coating the surface of the second land 13. Further, the depression 50 is a depression formed over the circumference of the coating layer C (see FIG. 3) of the spool 10.

Referring to FIGS. 1 and 2, for more information about the depression 50, the depression 50 includes a plurality of axial depression portions 51 extending linearly in the axial direction and a plurality of peripheral depression portions 52 extending linearly in the circumferential direction.

The axial depression portions 51 are arranged at predetermined intervals in the circumferential direction. Further, the opposite end portions of the axial depression portions 51 in the axial direction are separated from the right and left ends of the second land 13 in the axial direction, in other words, an end 13R on the side of the outlet port 23 and an end 13L on the side of the feedback port 25, and are closed in the axial direction.

Further, the axial depression portions 51 are in communication with the storage groove 40 formed at the left end portion thereof in the axial direction. More specifically, there are a portion in communication with the storage groove 40 from the side of the inlet port 24 and a portion in communication with the side of the end 13L of the second land 13 from the storage groove 40.

The peripheral depression portions 52 are arranged at predetermined intervals in the axial direction. Further, the peripheral depression portions 52 adjacent to each other in the circumferential direction have different positions in the axial direction, and the peripheral depression portions 52 one apart from each other in the circumferential direction have the same position in the axial direction. That is, the depressions 50 have the specific patterns equiangularly arranged over an entire circumference.

As illustrated in FIG. 3, a depth dimension L1 of the storage groove 40 is sufficiently deeper than a depth dimension L2 of the axial depression portions 51 (L1>L2). Specifically, the depth dimension L1 of the storage groove 40 is set to 100 μm, and the depth dimension L2 of the axial depression portions 51 is set to 5 μm. Further, the depth dimension of the peripheral depression portions 52 is substantially the same as the depth dimension of the axial depression portions 51. As long as the depth dimension of the storage groove 40 is set to be deeper than the depth dimension of the axial depression portions 51, the depth dimension of the storage groove 40 and the axial depression portions 51 can be freely changed. Preferably, the depth dimension L1 is five times or more the depth dimension L2.

Further, as illustrated in FIGS. 1 and 2, the second land 13 has a large number of load receiving portions 13a surrounded by a pair of adjacent axial depression portions 51 and a pair of adjacent peripheral depression portions 52 and by a pair of adjacent axial depression portions 51 and one of the peripheral depression portions 52. The load receiving portions 13a slide on the inner walls 33, 34 of the sleeve 20.

Next, the operation of the spool valve 1 will be described with reference to FIGS. 1 to 4.

As illustrated in FIG. 1, when the solenoid 80 is not energized, the spool 10 is moved to the right in the axial direction by the biasing force of the coil spring 90, so that the space between the second land 13 and the inner walls 33, 34 of the sleeve 20 is sealed. Accordingly, the valve is in a closed state in which the inflow of fluid from the inlet port 24 to the outlet port 23 is restricted. That is, the spool valve 1 is normally closed. The spool valve 1 may be normally open.

In the valve closed state, the first land 11 and the second inner wall 32 are separated from each other, and the discharge port 22 and the outlet port 23 are in communication with each other.

Further, in the valve closed state, the center portion of the depression 50 in the axial direction faces the annular space S, the right side of the center portion in the axial direction and the left side of the center portion in the axial direction face the third inner wall 33 and the fourth inner wall 34, respectively. Since the center portion is exposed to the fluid in the annular space S, the fluid is also supplied to the portions facing the inner walls 33, 34 of the sleeve 20 along the axial depression portions 51 and the peripheral depression portions 52. That is, the fluid is supplied to positions separated from the inlet port 24 in the axial direction.

In addition, since the depression 50 is formed over the circumference, the fluid is supplied regardless of the circumferential position.

Further, the opposite end portions of the depression 50 in the axial direction are closed in the vicinity of the end 13R and the end 13L of the second land 13. Additionally, said portions face the inner walls 33, 34 of the sleeve 20, so that the fluid in the depression 50 is prevented from leaking to the outside of the second land 13.

Further, since the storage groove 40 is in communication with the depression 50, the fluid is supplied from the inlet port 24 through the depression 50.

Further, the pressures acting on the ends 13R and 13L of the second land 13 are substantially the same since the feedback port 25 is in communication with the outlet port 23.

Next, the energized state will be described. In the spool valve 1, when the electromagnetic force generated by application of the current to the solenoid 80 exceeds the biasing force of the coil spring 90, the moving core 84 is drawn toward the stator 82, that is, toward the left side in the axial direction. Further, the rod 83 fixed to the moving core 84 moves axially leftward together to move the spool 10 axially leftward.

The depression 50 is formed in the second land 13 facing the inlet port 24, and the fluid is supplied to the entire depression 50 in the valve closed state as described above. Accordingly, a good lubrication state is maintained between the second land 13 and the third inner wall 33, which is easily affected by the fluid. Further, a good lubrication state is maintained between the second land 13 and the inner walls 33, 34. Accordingly, the driving force required to move the spool 10 is reduced, and the spool 10 can be stably moved in the axial direction.

Further, the depression 50 is supplied with not only the fluid flowing from the inlet port 24 but also is supplied with the fluid from the storage groove 40 as the fluid in the depression 50 moves due to the movement of the spool 10. Accordingly, the fluid can be supplied more reliably.

Further, when the spool 10 moves, the pressure of the fluid that has flowed into the depression 50 may generate buoyancy.

Further, into some of the axial depression portions 51 and some of the peripheral depression portions 52, the fluid that has moved from the other axial depression portions 51 and the other peripheral depression portions 52 onto the load receiving portions 13a due to the movement of the spool 10 also flows, so that fluid is less likely to be depleted.

As a result, a liquid film is formed between the inner walls 33, 34 and the second land 13, so that a strong frictional force is less likely to occur between the inner walls 33, 34 and the second land 13.

Referring to FIGS. 2 and 4, when the spool 10 is moved axially leftward from the valve closed state, the second land 13 and the third inner wall 33 are separated from each other, and the valve is brought into an open state in which the fluid flows from the inlet port 24 to the outlet port 23. Then, the spool 10 moves to the left in the axial direction as the applied current increases, and the valve opening is maximized in FIG. 2.

In the valve open state, the right half of the depression 50 in the axial direction faces the annular space S, and the left half in the axial direction located on the left side of the right half in the axial direction faces the fourth inner wall 34. Accordingly, the right half in the axial direction is exposed to the fluid in the annular space S, so that the fluid is also supplied to the left half in the axial direction facing the fourth inner wall 34 of the sleeve 20 along the axial depression portions 51 and the peripheral depression portions 52, that is, the fluid is supplied to a position separated from the inlet port 24 in the axial direction and facing the fourth inner wall 34.

Further, the storage groove 40 faces the fourth inner wall 34 both during non-energization (see FIG. 1), and during energization and when the valve opening is maximized (see FIG. 2), and is not in direct communication with the feedback port 25. Accordingly, the fluid in the storage groove 40 is prevented from being depleted.

Next, switching from the valve closed state to the valve open state will be described.

When switching is performed from the valve closed state to the valve open state, a force that moves the spool 10 in the radial direction transiently may act as indicated by the white arrow in FIG. 4, and the second land 13 may be pressed against the fourth inner wall 34 as indicated by the black arrow in FIG. 4. Even in such a case, the depression 50 retains the fluid, so that in the spool valve 1, a good lubrication state is maintained between the second land 13 and the inner walls 33, 34. Accordingly, the spool 10 can be stably moved axially leftward.

Further, since the depression 50 is formed over the circumference, the lubrication state between the second land 13 and the fourth inner wall 34 can be improved regardless of the circumferential position.

Further, the spool 10 is supported against the inner walls 33, 34 of the sleeve 20 by the plurality of load receiving portions 13a formed on the second land 13, tilting or deformation of the spool 10 to a large extent is prevented.

Further, when the spool 10 moves axially leftward, the left end portion of the depression 50 in the axial direction can communicate with the feedback port 25 to be supplied with the fluid from the feedback port 25. That is, the depression 50 extends in the axial direction, so that it is likely to communicate with the feedback port, and depletion of the fluid can be prevented.

Further, in the depression 50, the peripheral depression portions 52 are arranged discontinuously in the circumferential direction, so that the fluid is less likely to move linearly compared to a configuration in which the depression is continuous in the circumferential direction. Accordingly, the fluid is likely to be retained in the entire circumference.

Further, since the annular space S in the valve closed state is an annular space defined by the recess 24a between the third inner wall 33 and the fourth inner wall 34 and the second land 13, the force acting from the fluid is likely to be dispersed in the circumferential direction at the time of switching from the valve closed state to the valve open state, reducing the force that transiently moves the spool 10 in the radial direction. As a result, the second land 13 is less likely to bite into the inner walls 33, 34 of the sleeve 20, and a good lubrication state can be more stably maintained between the second land 13 and the inner walls 33, 34.

Second Embodiment

Next, a spool valve according to a second embodiment of the present invention will be described with reference to FIG. 5. The redundant descriptions of the same configuration as in the first embodiment will be omitted.

Figure 5A:
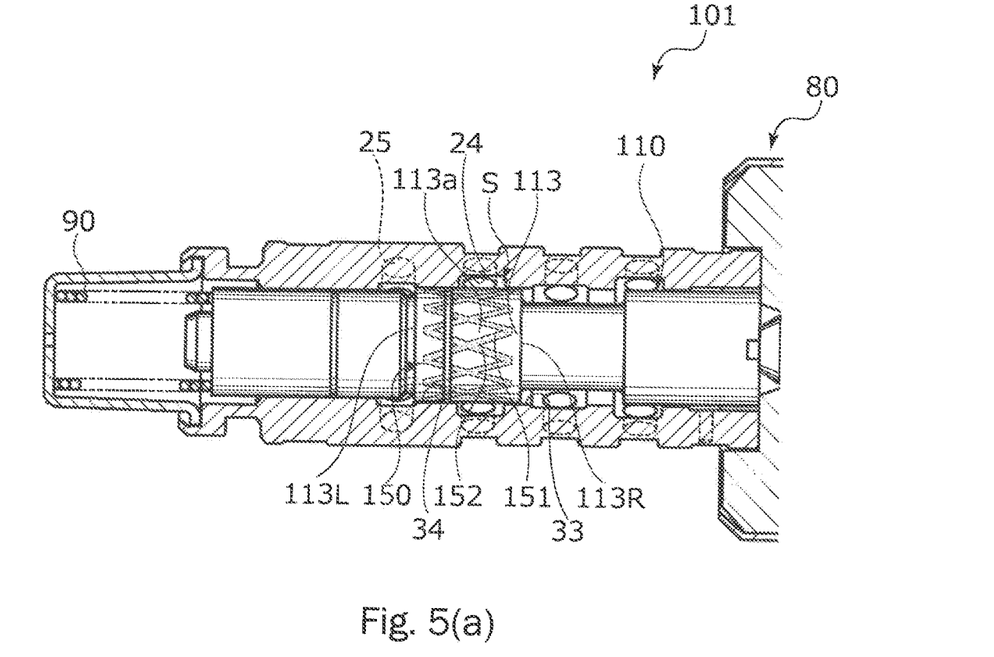
FIGS. 5(a)-(b) illustrate cross-sectional views illustrating a main part of a spool valve according to a second embodiment of the present invention.
Figure 5B:
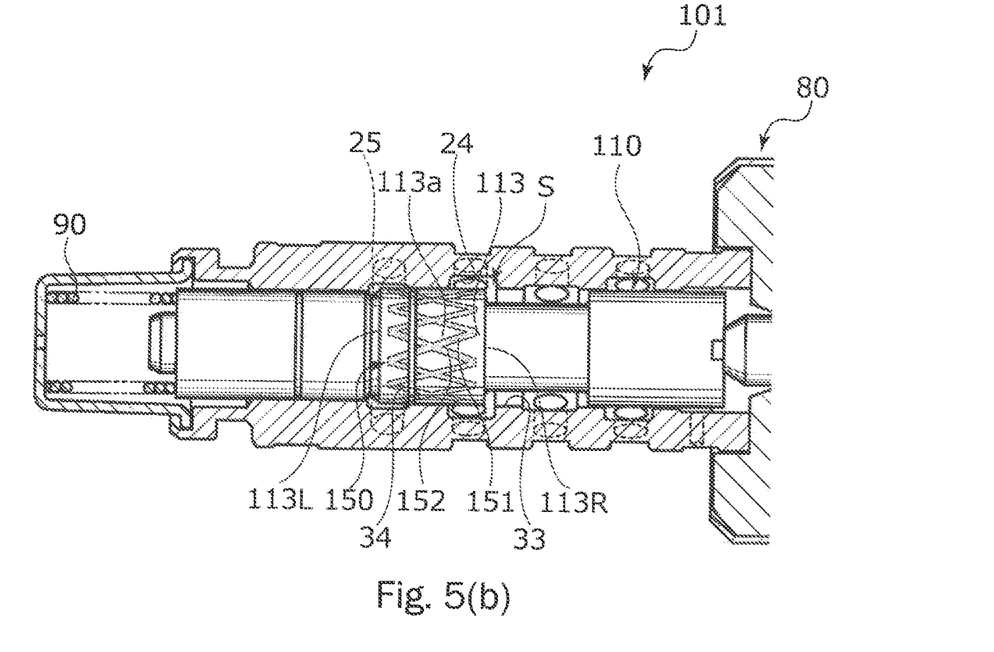

As illustrated in FIG. 5, a depression 150 is formed in a second land 113 of a spool 110 of a spool valve 101.

The depression 150 is composed of triangle wave shaped depression portions 151, 152 forming into a triangle wave shape and having the same amplitude and the same period with a phase shift of 180 degrees with respect to the circumferential direction. Further, the depression portions 151, 152 are in communication with each other at a plurality of locations in the circumferential direction. Further, the opposite end portions in the axial direction of the triangle wave shaped depression portions 151, 152 are separated from ends 113R, 113L of the second land 113 and are closed in the axial direction.

As described above, the depression 150 is formed in a single diagonal check pattern.

Further, the depth dimension of the triangle wave shaped depression portions 151 and the triangle wave shaped depression portions 152 is substantially the same as the depth dimension L2 of each of the axial depression portions 51 and the peripheral depression portions 52 in the first embodiment.

The second land 113 has a large number of load receiving portions 113a surrounded by the triangle wave shaped depression portions 151 and the triangle wave shaped depression portions 152. The load receiving portions 113a slide on the inner walls 33, 34 of the sleeve 20.

As a result, in the valve closed state, the depression 150 not only retains the fluid but also is supplied with the fluid from the inlet port 24, so that a good lubrication state is maintained between the second land 113 and the inner walls 33, 34. Accordingly, the spool 110 can be stably moved axially leftward.

Further, as illustrated in FIG. 5B, when the spool 110 moves axially leftward, the left end portion of the depression 150 in the axial direction can communicate with the feedback port 25 to receive fluid supply from the feedback port 25.

Further, when the spool 110 moves, the pressure of the fluid that has flowed into the depression 150 may generate buoyancy.

Further, into some of the triangle wave shaped depression portions 151 and some of the triangle wave shaped depression portions 152, the fluid that has moved from the other triangle wave shaped depression portions 151 and the other triangle wave shaped depression portions 152 onto the load receiving portions 113a due to the movement of the spool 110 also flows, so that fluid is less likely to be depleted.

As a result, a liquid film is formed between the inner walls 33, 34 and the second land 113, so that a strong frictional force is less likely to occur between the inner walls 33, 34 and the second land 113.

Third Embodiment

Next, a spool valve according to a third embodiment of the present invention will be described with reference to FIG. 6. The redundant descriptions of the same configuration as in the first and second embodiments will be omitted.

Figure 6A:
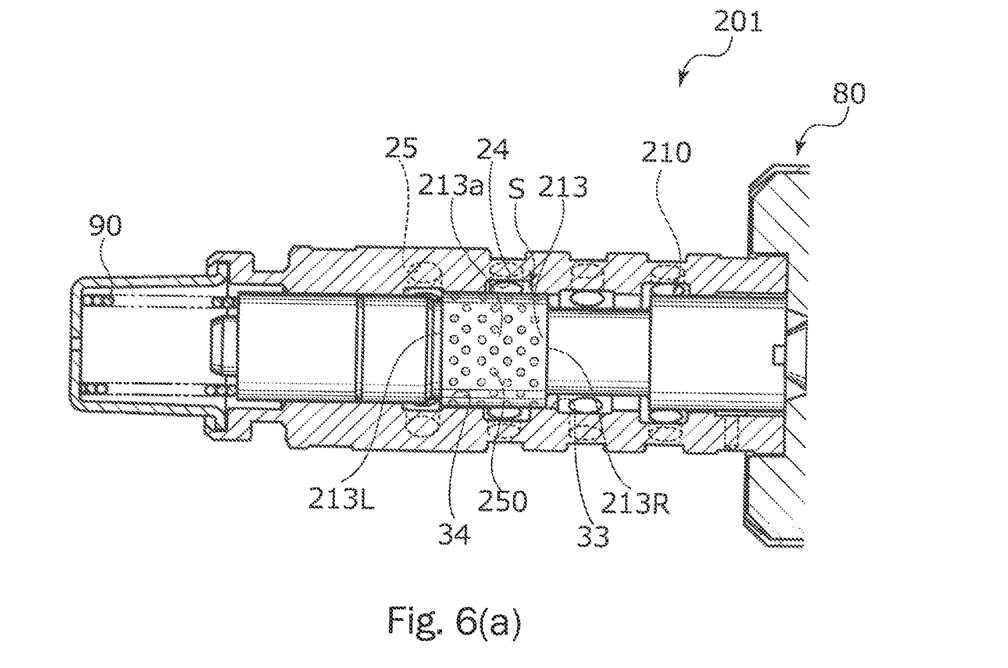
FIGS. 6(a)-6(b) illustrate cross-sectional views illustrating a main part of a spool valve according to a third embodiment of the present invention.
Figure 6B:
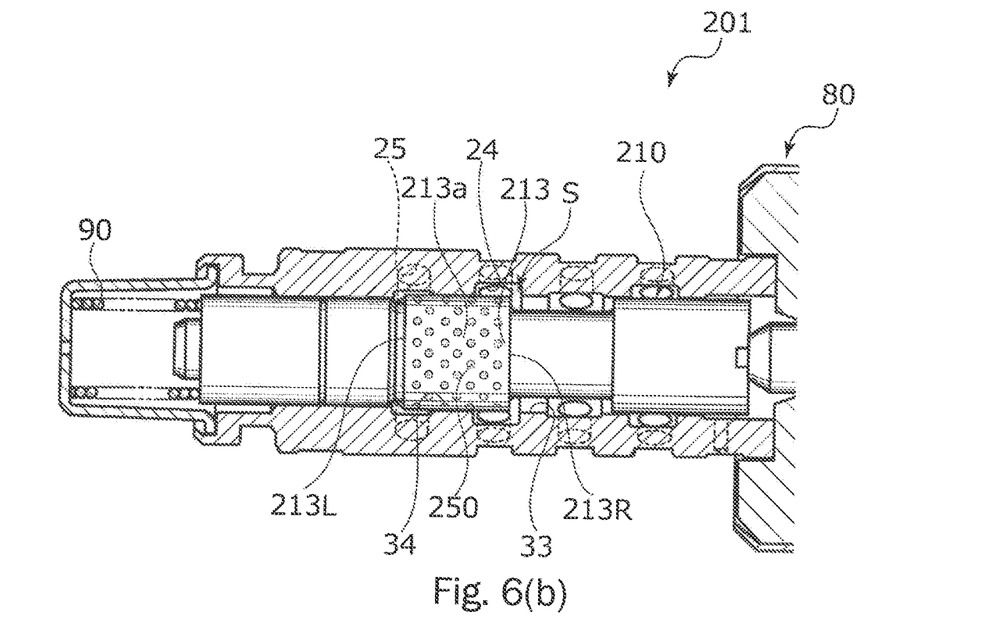

As illustrated in FIG. 6, a plurality of dimples 250 is formed in a second land 213 of a spool 210 of a spool valve 201. The dimples 250 are depressions recessed in the shape of a part of a sphere. A load receiving portion 213a is formed around the dimples 250. Further, the dimples 250 are separated from ends 213L, 213R of the second land 213. The dimples 250 may be recessed in a cylindrical shape, or may be recessed in a polygonal prism shape, and are not limited to have a shape of a part of a sphere.

Further, the depth dimension of the deepest portion of the dimple 250 is substantially the same as the depth dimension L2 of each of the axial depression portions 51 and the peripheral depression portions 52 in the first embodiment.

As a result, the dimples 250 facing the annular space S in the valve closed state are supplied with fluid, and the dimples 250 retain the fluid in the valve closed state. Accordingly, a good lubrication state are maintained between the second land 213 and the inner walls 33, 34, and thus the spool 210 can be stably moved axially leftward.

Further, as illustrated in FIG. 6B, when the spool 210 moves axially leftward, the dimples 250 located on the left side in the axial direction can communicate with the feedback port 25 to receive fluid supply from the feedback port 25.

Further, when the spool 210 moves, the pressure of the fluid that has flowed into the dimples 250 may generate buoyancy.

Further, in both the valve closed state and the valve open state, into some of the dimples 250 that do not face the inlet port 24 and the feedback port 25, the fluid that has moved from the other dimples 250 onto the load receiving portion 213a due to the movement of the spool 210 flows and is supplied, so that fluid is less likely to be depleted.

As a result, a liquid film is formed between the inner walls 33, 34 and the second land 213, so that a strong frictional force is less likely to occur between the inner walls 33, 34 and the second land 213.

Fourth Embodiment

Next, a spool valve according to a fourth embodiment of the present invention will be described with reference to FIG. 7. The redundant descriptions of the same configuration as in the first to third embodiments will be omitted.

Figure 7:
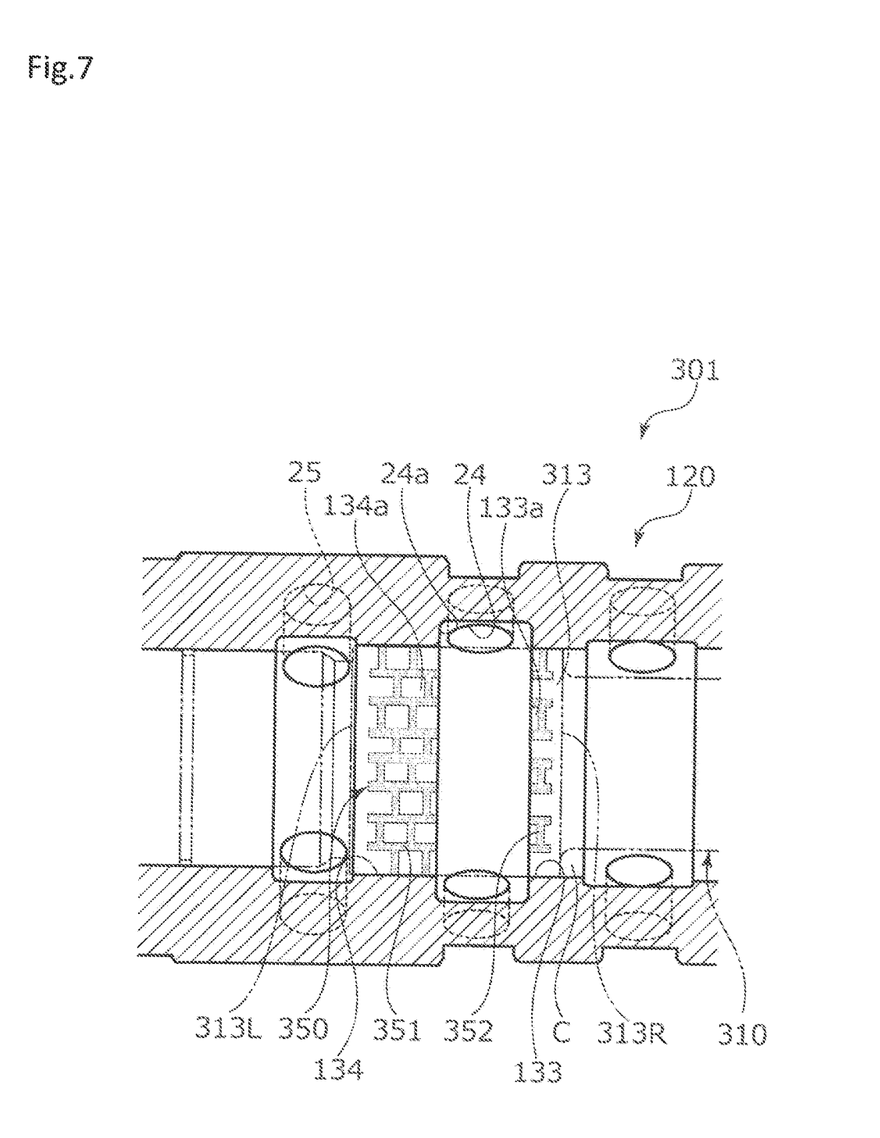
FIG. 7 is a cross-sectional view illustrating a main part of a spool valve according to a fourth embodiment of the present invention.

Referring to FIG. 7, no depressions are formed in a second land 313 of a spool 310 of a spool valve 301 and the second land 313 has a smooth outer peripheral surface. Meanwhile, a depression 350 is formed in the coating layer C of inner walls 133, 134 of a sleeve 120 and is composed of a plurality of axial depression portions 351 and a plurality of peripheral depression portions 352 and is in communication with the recess 24a.

Further, the depth dimension of the axial depression portions 351 and the peripheral depression portions 352 is substantially the same as the depth dimension L2 of each of the axial depression portions 51 and the peripheral depression portions 52 in the first embodiment.

In addition, the inner walls 133, 134 has a large number of load receiving portions 133a, 134a surrounded by a pair of adjacent axial depression portions 351 and a pair of adjacent peripheral depression portions 352 and by a pair of adjacent axial depression portions 351 and one of the peripheral depression portions 352. The second land 313 of the spool 310 is brought into sliding contact with the load receiving portions 133a, 134a.

As a result, in the valve closed state, the depression 350 not only retains the fluid but also is supplied with the fluid from the inlet port 24, so that a good lubrication state is maintained between the second land 313 and the inner walls 133, 134. Accordingly, the spool 310 can be stably moved axially leftward.

Further, the opposite end portions of the depression 350 in the axial direction are separated from ends 313L, 313R of the second land 313 in the valve closed state, and are not in communication with the outlet port 23 and the feedback port 25, preventing the fluid in the depression 350 from leaking to the outside of the second land 313.

Further, when the spool 310 moves, the pressure of the fluid that has flowed into the depression 350 may generate buoyancy.

Further, into some of the axial depression portions 351 and some of the peripheral depression portions 352, the fluid that has moved from the other axial depression portions 351 and the other peripheral depression portions 52 onto the load receiving portions 133a, 134a due to the movement of the spool 310 also flows, so that fluid is less likely to be depleted.

As a result, a fluid film is formed between the inner walls 133, 134 and the second land 313, so that a strong frictional force is less likely to occur between the inner walls 133, 134 and the second land 313.

Further, the spool 310 is supported by the plurality of load receiving portions 133a, 134a formed on the inner walls 133, 134, preventing tilting or deformation of the spool 310 to a large extent.

Although the embodiments of the present invention have been described above with reference to the drawings, the specific configuration is not limited to the embodiments, and any changes or additions made without departing from the scope of the present invention are included in the present invention.

For example, in the embodiments described above, the spool valve has been described as being configured to be driven by a solenoid, but the present invention is not limited to this, and the spool valve may be driven manually, hydraulically, or by other methods.

Figure 8A:
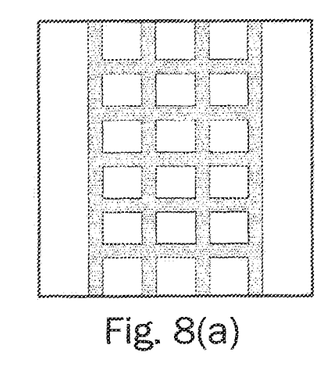
FIGS. 8(a)-(e) illustrate front views illustrating modifications of a depression in the embodiments of the present invention.
Figure 8B:
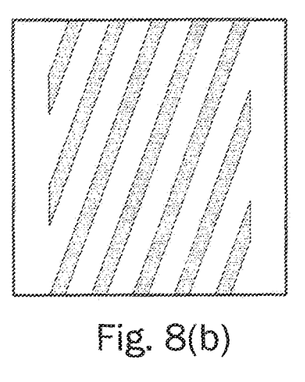
Figure 8C:
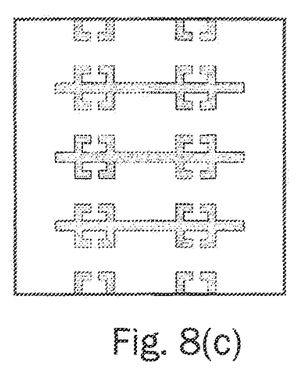
Figure 8D:
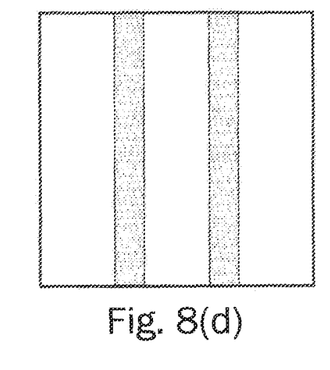
Figure 8E:
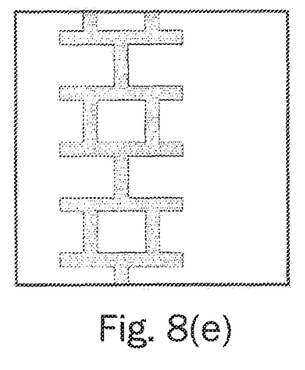

Further, although the depression has been described as being a depression having a shape of a ladder lottery, a depression having a diagonal check pattern, or the dimples, each of which is formed over the circumference, the present invention is not limited to this, and the depression may be a depression having a grid shape (see FIG. 8A), a depression having a diagonal stripe pattern (see FIG. 8B), or the like, each of which is formed over the circumference. In addition, a plurality of depressions having a plurality of L-shaped portions and inverted L-shaped portions extending in the circumferential direction from the axial depression portion may be arranged at predetermined intervals in the circumferential direction (see FIG. 8C). Alternatively, only a plurality of annular depressions that extend continuously in the circumferential direction may be spaced apart in the axial direction (see FIG. 8D). Further, a depression may be formed only in the portion that is brought into contact with the inner wall of the sleeve when the spool moves in the valve open direction (see FIG. 8E). In addition, the shapes according to the first to third embodiments and the shapes illustrated in FIG. 8 may be combined, and may be changed as appropriate.

Further, although the depression has been described as being formed in the second land facing the inlet port or in the inner wall of the sleeve communicating with the inlet port in the valve closed state, the present invention is not limited to this, and the depression may be formed in the land facing another port or in the inner wall of the sleeve communicating with another port.

Further, although the depression has been described as being formed on the second land or on the third and fourth inner walls, the present invention is not limited to this, and the depression may be formed in both of them.

Further, although the second land has been described as facing the annular space in communication with the inlet port, the present invention is not limited to this, and the second land may directly face the inlet port. Similarly, the depression formed in the inner walls of the sleeve may be in direct communication with the inlet port.

Further, although the depression has been described as being formed in the coating layer, the present invention is not limited to this, and the depression may be formed directly in the spool or in the sleeve.

Further, a plurality of load receiving portions may be formed or only one load receiving portion may be formed.

Further, the storage groove has been described as being formed by being cut before coating and then being coated, but the present invention is not limited to this, and the storage groove may not be coated after being cut.

Further, the land has been described as having an annular storage groove, but the present invention is not limited to this, and the storage groove may not be formed.

Further, although each of the ports has been described as a flow path extending mainly in the radial direction with respect to the through hole, the present invention is not limited to this, and each of the ports may be in communication with the through hole in the axial direction. That is, in the present invention, the spool valve is configured such that the land is provided so as to be able to slide on the inner wall regardless of the communication direction of the ports and a valve opening is adjusted by the land and the inner wall.

REFERENCE SIGNS LIST

1 Spool valve
10 Spool
13 Second land
13L, 13R End (end on adjacent port side)
13a Load receiving portion
20 Sleeve
22 Discharge port
23 Outlet port
24 Inlet port
25 Feedback port
33 Third inner wall
34 Fourth inner wall
40 Storage groove
50 Depression
51 Axial depression portion
52 Peripheral depression portion
101, 201 Spool valve
110 to 310 Spool
113 to 313 Second land
113L to 313R End (end on adjacent port side)
113a, 213a Load receiving portion
120 Sleeve
133 Third inner wall
133a, 134a Load receiving portion
134 Fourth inner wall
150 to 350 Depression
151, 152 Triangle wave shaped depression portion
250 Dimple
351 Axial depression portion
352 Peripheral depression portion
L1 Depth dimension
L2 Depth dimension
S Annular space

The invention claimed is:

1. A spool valve, comprising: a sleeve having a plurality of ports; and a spool arranged inside the sleeve and including a land configured so as to be brought into sliding contact with an inner wall of the sleeve, wherein
a depression is formed over an entire circumference in at least one of the land and the inner wall of the sleeve with which the land is brought into sliding contact,
the depression is a plurality of grooves which are arranged to extend in at least two different directions and to partially intersect with each other, a plurality of dimples which are arranged to be isolated from each other, or a plurality of diagonal grooves which are arranged to be inclined with respect to a circumferential direction and to be isolated from each other.

2. The spool valve according to claim 1, wherein
at least one of the land and the inner wall of the sleeve with which the land is brought into sliding contact has a load receiving portion between the adjacent grooves, dimples or diagonal grooves, the load receiving portion being configured to be brought into sliding contact with the inner wall of the sleeve or the land.

3. The spool valve according to claim 1, wherein
the land faces an inlet port through which fluid flows into the sleeve.

4. The spool valve according to claim 3, wherein
the depression is in communication with an annular space which is in communication with the inlet port.

5. The spool valve according to claim 1, wherein
the depression is in communication with a storage groove in which fluid is stored.

6. The spool valve according to claim 1, wherein
the depression is separated from opposite ends in the axial direction of a portion in which the depression is formed in at least one of the land and the inner wall of the sleeve with which the land is brought into sliding contact.

7. The spool valve according to claim 2, wherein the land faces an inlet port through which fluid flows into the sleeve.

8. The spool valve according to claim 7, wherein the depression is in communication with an annular space which is in communication with the inlet port.

9. The spool valve according to claim 2, wherein the depression is in communication with a storage groove in which fluid is stored.

10. The spool valve according to claim 2, wherein the depression is separated from opposite ends in the axial direction of a portion in which the depression is formed in at least one of the land and the inner wall of the sleeve with which the land is brought into sliding contact.

11. The spool valve according to claim 3, wherein the depression is in communication with a storage groove in which fluid is stored.

12. The spool valve according to claim 3, wherein the depression is separated from opposite ends in the axial direction of a portion in which the depression is formed in at least one of the land and the inner wall of the sleeve with which the land is brought into sliding contact.

13. The spool valve according to claim 4, wherein the depression is in communication with a storage groove in which fluid is stored.

14. The spool valve according to claim 4, wherein the depression is separated from opposite ends in the axial direction of a portion in which the depression is formed in at least one of the land and the inner wall of the sleeve with which the land is brought into sliding contact.

* * * * *